(12) United States Patent
Zhou et al.

(10) Patent No.: US 12,160,272 B2
(45) Date of Patent: Dec. 3, 2024

(54) DUAL-OUTPUT COHERENT OPTICAL TECHNOLOGY

(71) Applicant: Google LLC, Mountain View, CA (US)

(72) Inventors: Xiang Zhou, Sunnyvale, CA (US); Cedric F. Lam, San Jose, CA (US); Hong Liu, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 204 days.

(21) Appl. No.: 17/848,948

(22) Filed: Jun. 24, 2022

(65) Prior Publication Data

US 2023/0163854 A1    May 25, 2023

Related U.S. Application Data

(60) Provisional application No. 63/282,416, filed on Nov. 23, 2021.

(51) Int. Cl.
*H04B 10/61* (2013.01)
*G02B 6/27* (2006.01)
*G02B 6/293* (2006.01)
*G02B 27/28* (2006.01)
*H04B 10/50* (2013.01)

(52) U.S. Cl.
CPC ....... *H04B 10/5051* (2013.01); *G02B 6/2773* (2013.01); *G02B 6/2935* (2013.01); *G02B 27/283* (2013.01); *H04B 10/614* (2013.01)

(58) Field of Classification Search
CPC .................................................. H04B 10/614
See application file for complete search history.

(56) References Cited

U.S. PATENT DOCUMENTS

| | | | | |
|---|---|---|---|---|
| 2010/0054761 A1* | 3/2010 | Chen | | H04B 10/614 |
| | | | | 398/212 |
| 2012/0207474 A1* | 8/2012 | Inoue | | H04B 10/613 |
| | | | | 359/325 |
| 2014/0193152 A1 | 7/2014 | Zhou et al. | | |
| 2016/0241344 A1 | 8/2016 | Han et al. | | |
| 2017/0192173 A1* | 7/2017 | Evans | | H04B 10/615 |
| 2022/0345224 A1* | 10/2022 | Gui | | H04B 10/614 |
| 2023/0045731 A1* | 2/2023 | Shukunami | | H04B 10/614 |

OTHER PUBLICATIONS

International Search Report and Written Opinion for International Application No. PCT/US2022/050923 dated Mar. 24, 2023. 13 pages.
X. Zhou, R. Urata and H. Liu, "Beyond 1 Tb/s Intra-Data Center Interconnect Technology: IM-DD OR Coherent?," in Journal of Lightwave Technology, vol. 38, No. 2, pp. 475-484, Jan. 15, 2020.
D. Welch et al., "Point-to-Multipoint Optical Networks Using Coherent Digital Subcarriers," in Journal of Lightwave Technology, vol. 39, No. 16, pp. 5232-5247, Aug. 15, 2021.

* cited by examiner

*Primary Examiner* — Nathan M Cors
(74) *Attorney, Agent, or Firm* — Lerner David LLP

(57) ABSTRACT

The proposed technology allows for 1+1 optical protection and may improve coherent module output optical power by 3 dB over similar transmitter (Tx) and receiver (Rx) implementation complexity, as well as allow for integration into existing datacenter formats.

8 Claims, 10 Drawing Sheets

800

DUAL-OUTPUT COHERENT OPTICAL TECHNOLOGY

CROSS-REFERENCE TO RELATED APPLICATIONS

The present application claims the benefit of the filing date of U.S. Provisional Patent Application No. 63/282,416, filed on Nov. 23, 2021, the disclosure of which is hereby incorporated by reference.

BACKGROUND

Coherent optical communications technology typically involves modulating the amplitude and phase of light, as well as transmission across two polarization states, in transporting information over a fiber optic cable. Coherent optical communications technology offers the potential to make use of more of the available bandwidth of a fiber optic cable or transmission path than competing technologies. Such communications typically make use of a coherent optical receiver. In such a receiver, the transmitted signal is interfered with using a local oscillator (LO) that provides for extraction of phase information and is thus referred to as a coherent receiver.

As compared to other forms of optical transmission, such as intensity modulation and direct detection (IM-DD), coherent optical technology offers as possible advantages: higher receiver sensitivity, higher spectral efficiency (SE), and higher tolerance towards various linear optical impairments such as fiber chromatic dispersion (CD) and polarization mode dispersion (PMD). In applications where the state of polarization (SOP) is not maintained during transmission, a phase- and polarization-diversity four dimensional (4D) vector receiver is typically employed to detect and demodulate the coherently modulated signal. 4D refers to the separate inphase (I) and quadrature (Q) components of the X-polarized signal and Y-polarized signal ($I^+$, $I^-$, $Q^+$, $Q^-$ for the X-polarized signal; and $I^+$, $I^-$, $Q^+$, $Q^-$ for the Y-polarized signal). A 4D vector receiver is also typically used when the received signal is only a two dimensional (2D) modulated optical signal, such as a single polarization (SP) quadrature amplitude modulated (QAM) signal or a one dimensional (1D) modulated signal such as a SP-pulse amplitude modulation (SP-PAM) signal.

Pluggable coherent optical technologies operate within the boundaries of a number of design constraints. The first is link budget challenge when using a high bandwidth throughput, such as, for example, 800 Gbps (Gbps or Gb/s denoted "G") or higher, for 1+1 protected applications in which a redundant signal is sent over a network. The second is the cost-effectiveness challenge for "breakout" applications in point to multi-point networks or applications. Another constraint is relatively tight power dissipation requirements, which limit the power consumption of pluggable optical modules. In this regard, module power density has typically increased with demand for higher bandwidth. These, as well as other constraints, are factors that are taken into account in module design and deployment of this type of technology.

SUMMARY

Aspects of the disclosed technology include methods, systems, and apparatuses that relate to pluggable coherent optics. For instance, the disclosed technology may comprise a dual input receiver or a dual output transmitter. In other instances, the disclosed technology may comprise a pluggable coherent transceiver that includes one or more of each of a dual input receiver and a dual output transmitter.

For example, an aspect of the disclosed technology may comprise a dual input receiver comprising a first polarization beam splitter configured to receive a first signal; and a second polarization beam splitter configured to receive a second signal, wherein the second signal is a copy of the first signal. The first polarization beam splitter may be configured to split the first signal into a first component and a second component, and to provide the first component of the first signal to a first optical coupler of a first 90-degree hybrid and the second component of the first signal to a second optical coupler of a second 90-degree hybrid. In addition, the second polarization beam splitter may be configured to split the second signal into two components, and provide a first component of the second signal to the first optical coupler of the first 90-degree hybrid and a second component of the second signal to the second optical coupler of the second 90-degree hybrid. Further, the first and second optical couplers of the first 90-degree hybrid and the second 90-degree hybrid can be coupled to a local oscillator such that the first and second 90-degree hybrids output phase or polarization information associated with the first signal.

In accordance with this aspect of the disclosed technology, the first optical coupler of the first 90-degree hybrid outputs a first coupling signal to a third optical coupler and the third optical coupler outputs a first set of output signals comprising at least a portion of output phase or polarization information. Further, the first optical coupler of the first 90-degree hybrid outputs a second coupling signal to a fourth optical coupler and the fourth optical coupler outputs a second set of output signals comprising at least a portion of the output phase or polarization information. In addition, the local oscillator outputs one or more local oscillation signals to the third optical coupler and to the fourth optical coupler. Further, the dual input receiver may also comprise a one-by-four splitter coupled to the local oscillator.

Further in accordance with this aspect of the disclosed technology, the second optical coupler of the second 90-degree hybrid outputs a third coupling signal to a fifth optical coupler and the fifth optical coupler outputs a third set of output signals comprising at least a portion of the output phase or polarization information. In addition, the second optical coupler of the second 90-degree hybrid outputs a fourth coupling signal to a sixth optical coupler and the sixth optical coupler outputs a fourth set of output signals comprising at least a portion of the output phase or polarization information. Moreover, the local oscillator outputs one or more local oscillation signals to the fifth optical coupler and to the sixth optical coupler and the dual input receiver may also comprise a one-by-four splitter coupled to the local oscillator.

Another aspect of the disclosed technology may comprise a dual output transmitter. The dual output transmitter comprises a plurality of Mach-Zehnder Modulators (MZMs) configured to receive a laser output signal and to each output an original inphase component or an original quadrature component based on the laser output signal; a first polarization beam combiner coupled to the plurality of the plurality of MZMs and configured to combine a first original inphase component and a first original quadrature component in a X-polarization plane and a Y-polarization plane to produce a first transmit signal, in which the first original inphase component is based on a first signal generated by a first MZM of the plurality of MZMs and the first original quadrature component is based on a second signal generated by a second MZM of the plurality of MZMs; and a second polarization beam combiner coupled to the plurality of the plurality of MZMs and configured to combine a first complementary inphase component and a first complementary quadrature component in the X-polarization plane and the Y-polarization plane to produce a second transmit signal, in which the first complementary inphase component is based on a third signal generated by a third MZM of the plurality of MZMs and the first complementary quadrature component is based on a fourth signal generated by a fourth MZM of the plurality of MZMs. In addition, the first transmit signal and the second transmit signal contain equivalent information.

In accordance with this aspect of the disclosed technology, the second signal generated by the second MZM of the plurality of MZMs is provided to a first 90-degree phase shifter and the first 90-degree phase shifter is coupled to the first polarization beam combiner through a first optical coupler. Further, the first 90-degree phase shifter can be coupled to the first MZM of the plurality of MZMs and configured to receive the first signal. Further in accordance with this aspect of the disclosed technology, the first signal is provided to the first optical coupler and the first optical coupler is coupled to the second polarization beam combiner.

Further in accordance with this aspect of the disclosed technology, the fourth signal generated by the fourth MZM of the plurality of MZMs is provided to a second 90-degree phase shifter and the second 90-degree phase shifter is coupled to the second polarization beam combiner through a second optical coupler. In addition, the second 90-degree phase shifter is coupled to the third MZM of the plurality of MZMs and configured to receive the third signal. Further, the third signal is provided to the second optical coupler and the second optical coupler is coupled to the first polarization beam combiner.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Overview

The disclosed technology can improve the coherent module output optical power by 3 dB by using the same laser with similar transmitter (Tx) and receiver (Rx) implementation complexity. Such an increase in module output power can be used to increase the supported link loss for optical transport systems requiring 1+1 optical protection, as further described below, and can also be used to improve the cost-effectiveness and/or performance of coherent optics for point to multi-point breakout applications.

For example, the disclosed technology makes use of a pair of polarization beam combiners (or splitters) such that the complementary outputs of a pair of I/Q modulators, one in the X-polarization and the other in the Y-polarization, are used to provide dual outputs of the same coherently-modulated optical signal, which in effect doubles the coherent transceiver output power by 3 dB without using a 3 dB coupler. As another example, a dual-output and dual-input coherent optical transceiver can be implemented using the disclosed technology. This technology may enable four 400 Gb/s or eight 400 Gb/s applications while reducing the number of optical components required to enable such applications, e.g., by about one-half. As another example, the technology allows for implementation of a receiver that receives two signals independently without use of an additional 3 dB coupler (to combine the received signals).

The disclosed technology may improve link budgets by as much as, or more than, 6 dB.

Example Systems

The following figures illustrate aspects of the disclosed technology. A person of skill in the art will understand that the various disclosed components can be coupled electronically by one or more of the disclosed electronics, processors, and computing devices to perform the methods and techniques disclosed herein. For simplicity and clarity, not every electronic or data link is illustrated.

Figure 1:
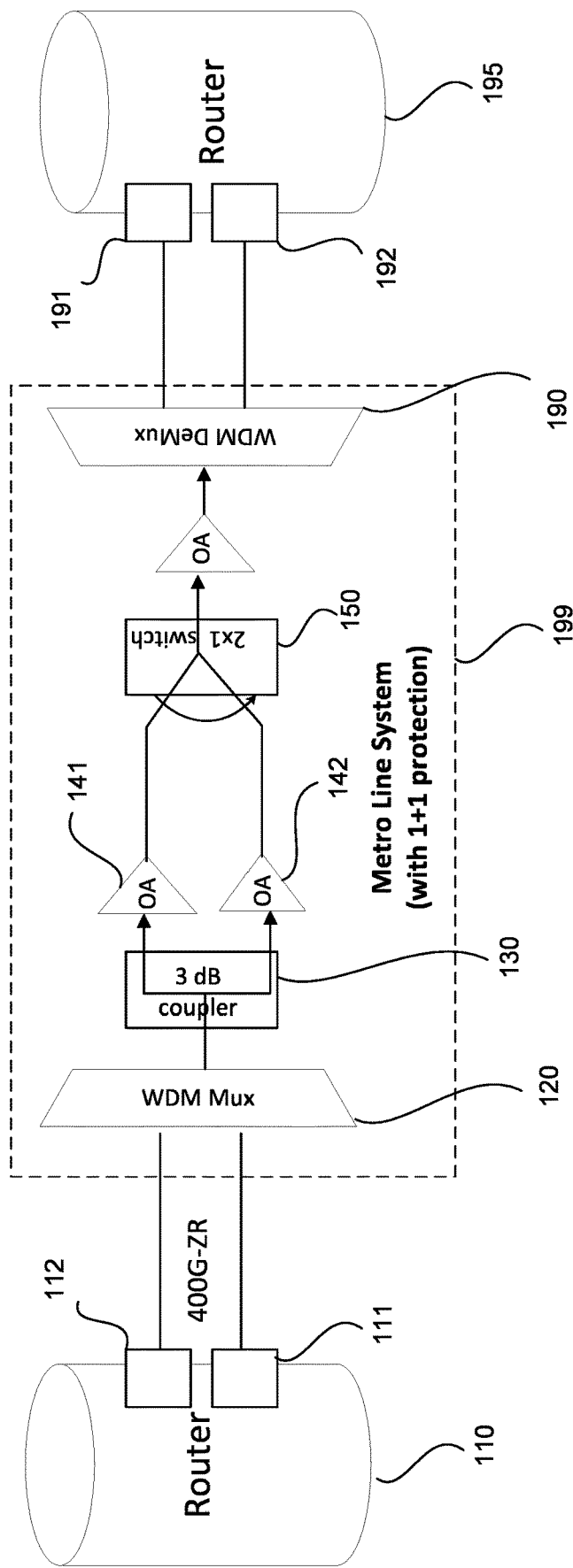
FIG. 1 is a schematic illustration of a 1+1 protected metro transport system using pluggable 400 G-ZR coherent optical technology according to aspects of the disclosure.

FIG. 1 is a schematic illustration of a 1+1 protected metro transport system 100 using pluggable 400G-ZR coherent optical technology. Unlike long-haul (LH) transport networks where mesh topologies are typically used, point-to-point links are often used in metro networks. For such point-to-point optical links, 1+1 optical protection (e.g., providing transmitted information on a separate or protection optical link) may be utilized to minimize the impact of fiber link failures, as is shown in FIG. 1.

Illustrated in FIG. 1 is a router 110 with ports 111 and 112 and router 195 with ports 191 and 192. Data can be sent from router 110 to router 195 via the metro line system 199. Router 110 can be optically connected with a wavelength division multiplexer 120 connected to an optical coupler 130. Optical coupler 130 is connected to optical amplifiers (OAs) 141 and 142, which in turn are optically connected to a two-by-one switch 150. Two-by-one switch 150 can take two input signals and output one output signal to a wavelength-division multiplexing (WDM) demultiplexer (DeMux), such as WDM DeMux 190. WDM DeMux 190 can demultiplex the signals it receives into two signals and provide these signals to router 195 through ports 191 and 192. In fiber optic communications, wavelength-division multiplexing (WDM) is a technology which multiplexes a number of optical carrier signals onto a single optical fiber by using different wavelengths or colors of laser light. In some examples, ports 111, 112 (or 191, 192) can contain or include a transceiver, such as a single-output and single-input coherent transceiver, such as that described with respect to FIG. 4.

As illustrated in FIG. 1, to enable 1+1 protection, a 3 dB optical coupler splits the wavelength-multiplexed optical signal into two paths. One of these two paths can be considered a main signal path, and the other can be considered a protection path. Due to the requirement of the need of a 3 dB coupler prior to the optical amplifier, the optical signal to noise ratio (OSNR) "launched" or sent from router 110 will be reduced by at least 3 dB. While such a 3 dB (or greater) reduction in launch OSNR can still be manageable for 400 G-ZR based metro systems, the impact of the 3 dB or larger reduction on the supported link loss will become proportionately larger at speeds of 800G and beyond. For example, in some instances the link loss experienced may be beyond that which is required (e.g., 20 dB to 16 dB).

Figure 2:
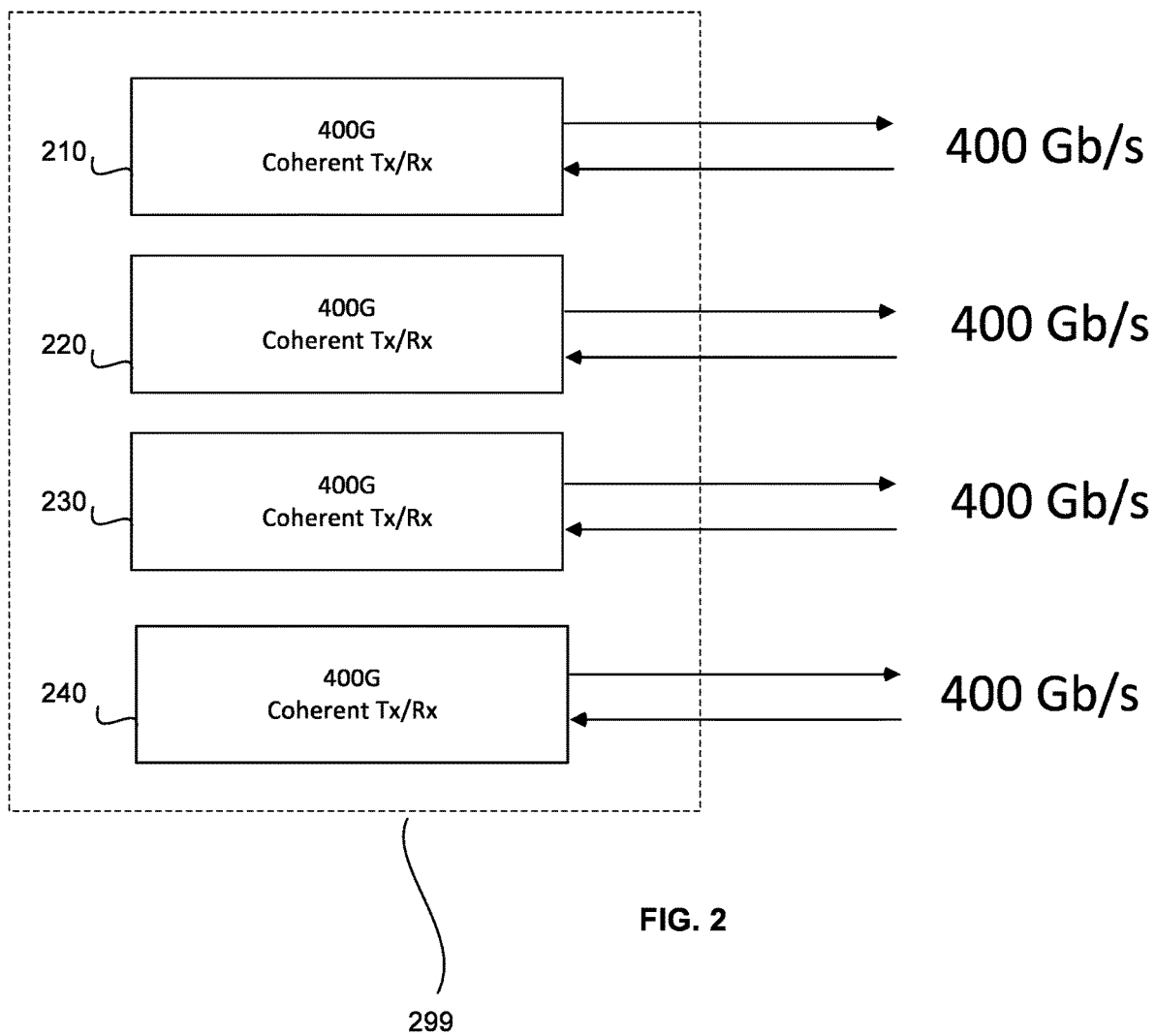
FIG. 2 is a schematic illustration of a 1.6 Tb/s coherent DR4 optical module design using coherent optical technology according to aspects of the disclosure.

FIG. 2 is a schematic illustration of a 1.6 Tb/s coherent DR4 optical module design using the coherent optical technology according to aspects of the present disclosure. Breakout capability, such as illustrated in FIG. 2, is not only needed in data center networks, such as a top of rack switch to middle block connections within data centers, but is also useful in mobile front haul as well as traditional telecom and cable access networks.

Illustrated in FIG. 2 is optical module 299 which can comprise four coherent transceiver units capable of transmitting and receiving optical signals, such as coherent transceivers 210, 220, 230, and 240. In some examples, coherent transceivers can contain independent transmitters (Tx) and receivers (Rx). The overall speed of optical module 299 can be the sum of the coherent transceivers it contains. For example, in FIG. 2, optical module 299 can have an overall speed of 1.6 Tb/s while each coherent transceiver has a speed of 400 Gb/s. Coherent optical transceivers or modules can use coherent modulation and can have an electrical interface and an optical interface which connect through an optical system, such as through a fiber optic cable.

For breakout applications such as illustrated in FIG. 2, the breakout or fan-out speed is typically four or eight times lower than the optical module speed. Breakout can refer to the breaking out or fanning out of the overall signal through different optical pathways. For example, with coherent optical technology, a 1.6 Tb/s coherent DR4 optical module will require four sets of 400 Gb/s coherent Tx and Rx, while the 3.2 Tb/s DR8 optical module will require eight sets of 400 Gb/s coherent Tx and Rx. Although not illustrated in FIG. 2 for simplicity, as each set of coherent Tx and Rx can require four optical modulators in addition to four balanced photodetectors (PDs) and transimpedance amplifiers (TIAs), cost-effectiveness could be hard to achieve with this design method.

Figure 3:
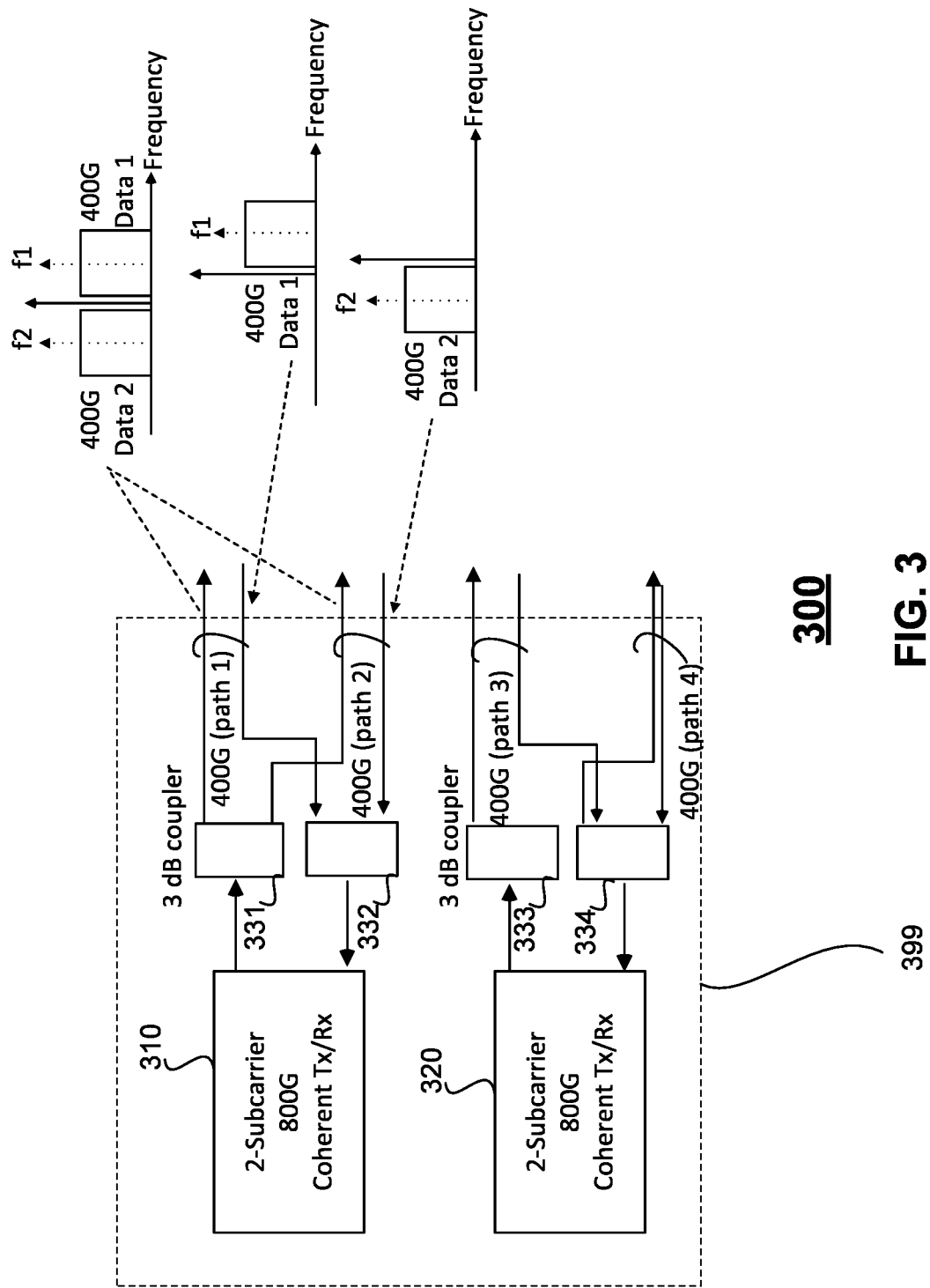
FIG. 3 is a schematic illustration of a digital subcarrier-based 1.6 Tb/s coherent DR4 optical module design according to aspects of the disclosed technology.

FIG. 3 is a schematic illustration of a digital subcarrier-based 1.6 Tb/s coherent DR4 optical module design according to aspects of the disclosed technology. FIG. 3 shows an example implementation of a digital subcarrier-based 1.6 Tb/s coherent DR4 optical module design. As illustrated in FIG. 3, the data (e.g., data 1 and data 2) can be encoded at different frequencies.

FIG. 3 illustrates an optical module 399 containing two 2-subcarrier 800 Gb/s coherent transceivers 310 and 320, which can be similar to coherent transceivers described herein. Coherent transceiver 310 can be connected to 3 dB optical couplers 331 and 332, while coherent transceiver 320 can be connected to 3 dB optical couplers 333 and 334. 3 dB optical couplers 331-334 can receive one optical signal and transmit two optical signals, or vice versa, receive two optical signals and couple the two signals into one output optical signal. Various paths have been labeled with respect to FIG. 3. For instance, 400G path 1 can include an outgoing signal from 3 dB optical coupler 331 and an incoming signal to optical coupler 332.

As compared to the coherent optics implementation described with respect to FIG. 2, the digital subcarrier-based implementation shown in FIG. 3 can reduce the required optical components by half through the use of higher-bandwidth components. To break out the subcarrier-modulated two 800G coherent optical signals into four 400G optical signals, a 3 dB coupler may be introduced at both the transmitter and the receiver of FIG. 3. This can translate into a 6 dB link budget loss.

Figure 4:
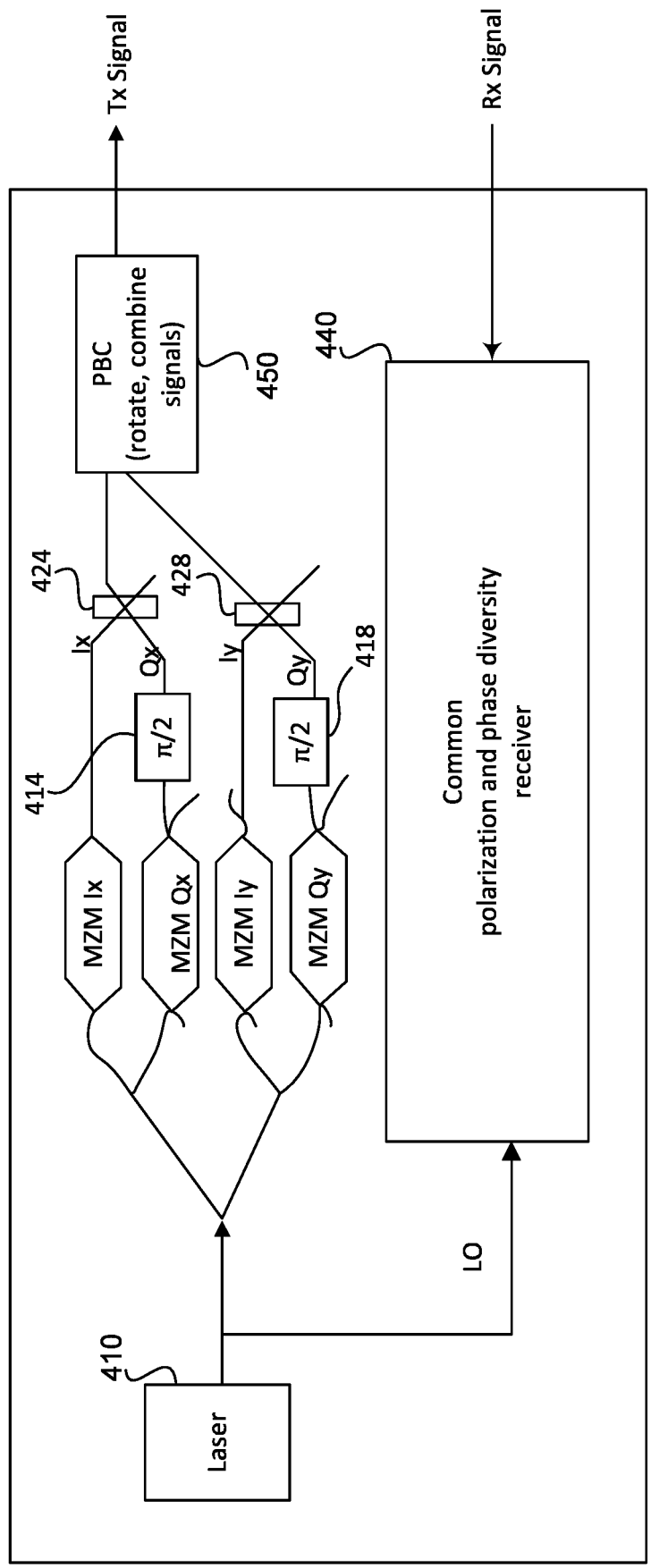
FIG. 4 is a schematic illustration of a single-output and single-input coherent transceiver.

FIG. 4 is a schematic illustration of a single-output and single-input coherent transceiver 400. FIG. 4 illustrates a laser 410 which is connected to a single-output and single-input coherent transceiver. Laser 410 is connected through a local oscillator (LO) to a common polarization and phase diversity receiver as part of processing a received signal. Though laser 410 is shown in a block with the other components, it may be located outside the block, separate from the other components of the coherent transceiver 400. Laser 410 can be any light source, including but not limited to any combination of lasers, specially designed semiconductors, incandescent light, electrodeless lamps, or halogen lamps. As one example, laser 410 can be a distributed feedback laser. Laser 410 can be electronically controlled to encode signals within a pulse or wave of light. Laser 410 can be optically coupled to a modulator.

Laser 410 can be coupled to Mach-Zehnder modulators (MZMs), illustrated but not labeled in FIG. 4 for simplicity. Each MZM can receive or generate an inphase (I) component of an optical signal generated by laser 410 or a quadrature (Q) component. Further, each MZM can also receive an "X" or "Y" component or polarization of the transmitted light, to generate the possibilities of inphase x (Ix), inphase y (Iy), quadrature x (Qx), and quadrature y (Qy). The $\pi/2$ blocks 414, 418 introduce a phase difference between the inphase and quadrature components. As illustrated in FIG. 4, the inphase and quadrature components have a $\pi/2$ (or 90-degree) phase difference. The output of the MZM Qx element is input to $\pi/2$ phase rotator 414. $\pi/2$ phase rotator 414 introduces a $\pi/2$ phase difference between the inphase (Ix) and quadrature (Qx) X components. Similarly, phase rotator 418 introduces a $\pi/2$ phase difference between the inphase (Iy) and quadrature (Qy) Y components.

Outputs of the MZM and $\pi/2$ blocks are illustratively depicted as coupled via the cross-over points 424, 428 and thereafter received at polarization beam combiner (PBC) 450. The cross-over points 424, 428 may each comprise a 3 dB coupler that combines the inphase and quadrature signal components. PBC 450 therefore receives inphase and quadrature components and combines them, and transmits the combined signal. For example, with respect to FIG. 4, PBC 450 combines the Qx and Qy components. PBC 450 includes a 90-degree polarization rotator that rotates the polarization axis of, for example, X-polarized light onto the y-axis, or vice versa. In operation, the PBC 450 also functions to combine the x- and y-signal components, which as a practical matter may comprise identical transverse electric-mode (TE-mode) (or transverse magnetic-mode (TM-mode)) signals. TE- to TM-mode (or vice versa) conversion (i.e., polarization conversion) is done within PBC 450. PBC 450 may be considered as a PBS 450. As one skilled in the art may recognize, a polarization beam combiner generally performs the function of combining two orthogonal polarizations into a single-output signal, whereas a polarization beam splitter splits a single input into orthogonal polarization components. Accordingly, as a practical matter, the same optical circuit or device may be configured to perform either function.

Receiver 440 can be a common polarization and phase diversity receiver. Receiver 440 can contain any of the components described with respect to FIG. 6 below to allow the receiver to receive and convert an optical signal to a digital signal.

Figure 5:
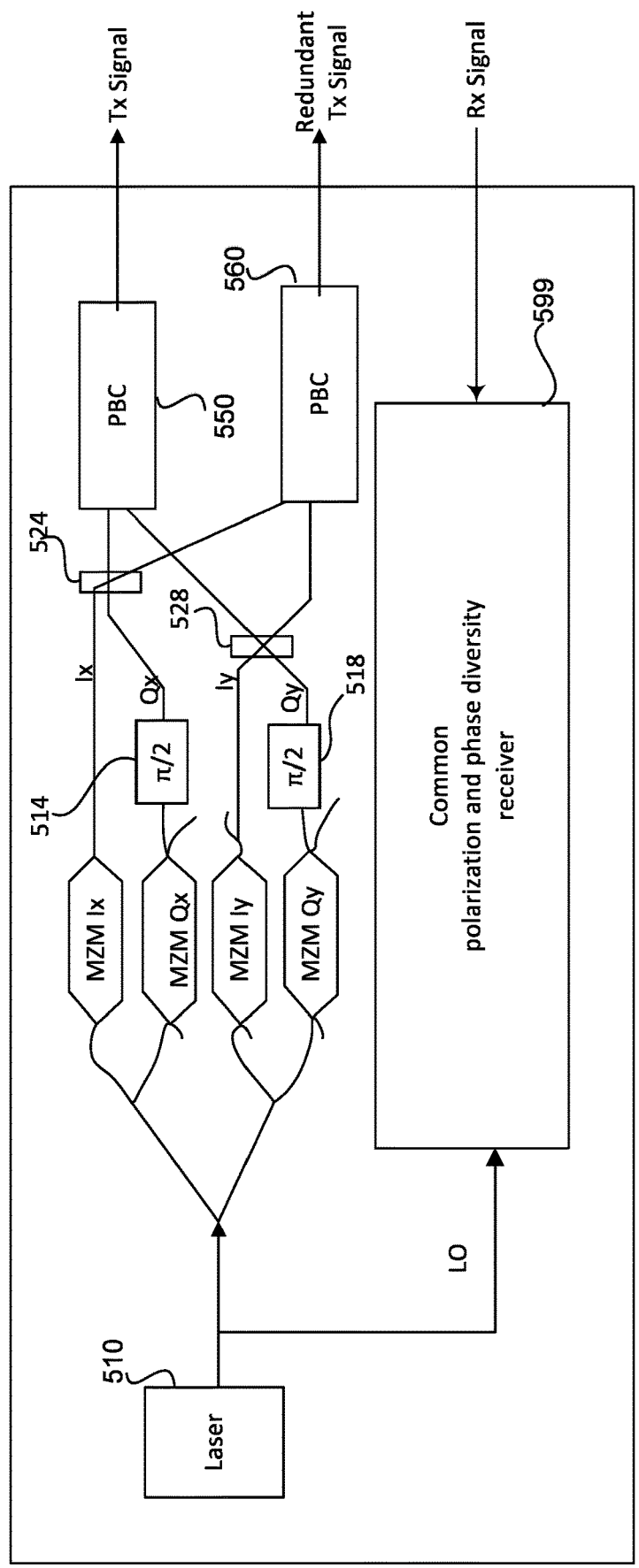
FIG. 5 is a schematic illustration of a first example dual-output and single-input coherent optical transceiver technology according to aspects of the disclosed technology.

FIG. 5 is a schematic illustration of a first example dual-output single-input coherent optical transceiver or module 500 technology according to aspects of the disclosed technology. Illustrated in FIG. 5 is a laser 510, which can be similar to laser 410, and a receiver 599 that may form an optical module. Receiver 599 can be a common polarization and phase diversity receiver similar to receiver 440. Laser 510 is optically coupled to a number of MZMs and, as previously discussed, may be included outside the block including the other elements shown in the figure. As illustrated in FIG. 5, the outputs of certain MZMs are phase rotated by 90-degrees at blocks 514, 518 such that there is a π/2 (or 90-degree) phase difference between the inphase and quadrature components. The inphase and quadrature signals are thereafter combined in 3 dB couplers 524, 528 in both X- and Y-polarization (the upper two MZMs for X-polarization and the lower two MZMs for Y-polarization). PBC 550 can receive the inphase and quadrature y components while PBC 560 can receive the inphase and quadrature x components. PBC 550, 560 include 90-degree polarization rotators, which function as discussed above. More generally, PBC 550, 560 function to combine the x- and y-signal components and each output a transmit signal. Each transmit signal includes the same information and thus provides the outputs needed for a 1+1 protection scheme.

In comparison to the single-output, single-input coherent transceiver technology illustrated in FIG. 4, where the inphase components output by the MZM I/Q modulators are disregarded, coherent transceiver technology of FIG. 5 introduces an additional polarization beam combiner (PBC) 560 to combine the complementary outputs of the two I/Q modulators, one in the X-polarization and the other one in the Y-polarization. It thus allows dual outputs of the same coherently-modulated optical signal without using a 3 dB coupler, in effect doubling the coherent transceiver output power by 3 dB.

Figure 6:
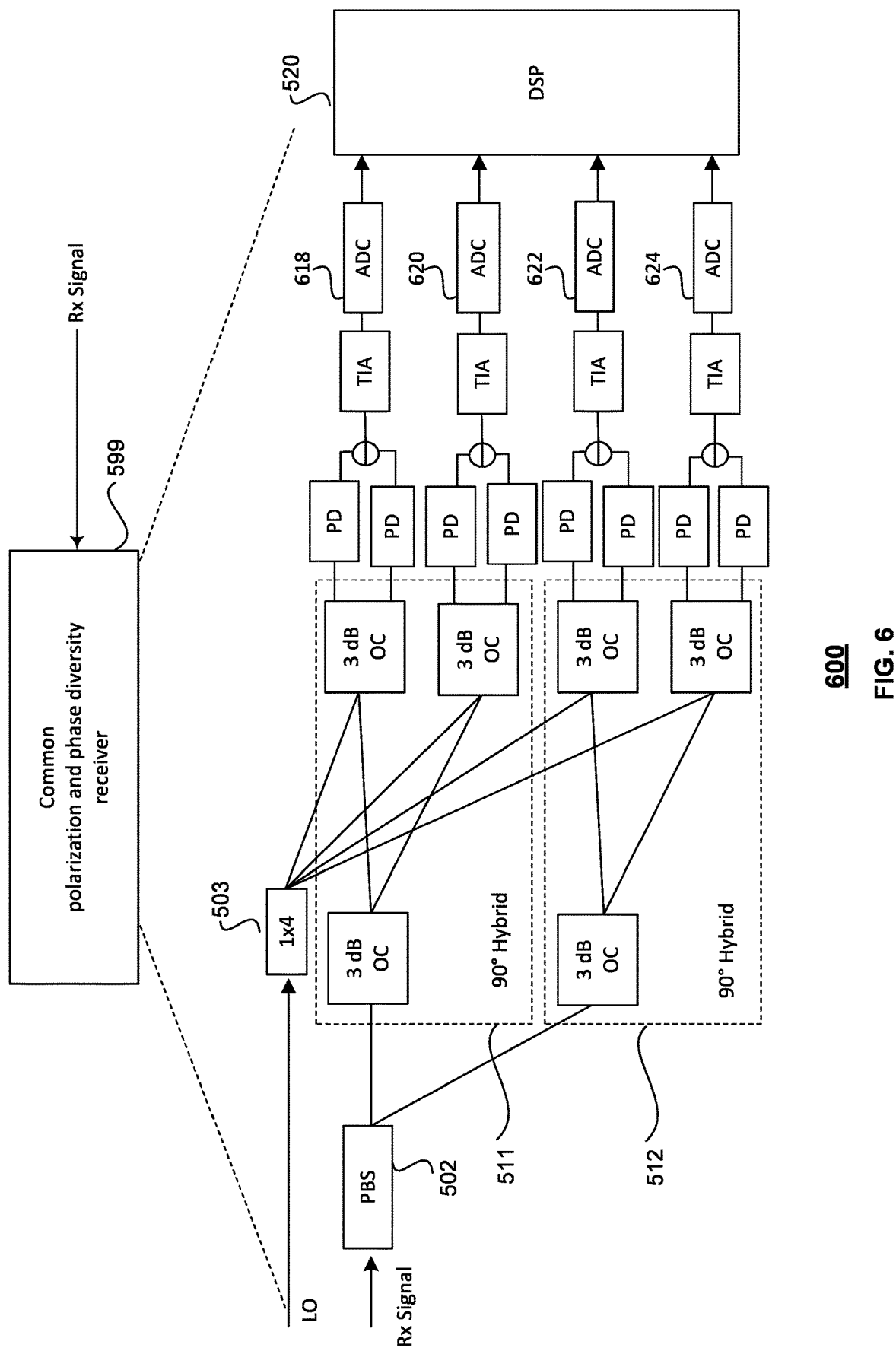
FIG. 6 is an expanded view of a common polarization and phase diversity receiver.

FIG. 6 is an expanded view of a common polarization and phase diversity receiver 599 of FIG. 5. For clarity, not every component is labeled in FIG. 6.

Receiver 599 can include a polarization beam splitter (PBS) 502, a one-by-four splitter 503, a local oscillator (LO), 90-degree hybrids 511 and 512, optical couplers (OCs), photodetectors (PDs) and transimpedance amplifiers (TIAs), or combined PD/TIAs, analog to digital convertors (ADCs), and a digital signal processor (DSP) 520.

PBS 502 can receive a signal which can be modulated or configured according to a configuration scheme. For example, PBS 502 can receive encoded information as a light signal. PBS 502 can split a beam of light into two orthogonal components. In some examples, PBS 502 can be a plate beam splitter or a cube beam splitter. PBS 502 can polarize the light into two orthogonal components, such as an "X" polarization and a "Y" polarization. As used herein, X and Y can represent two orthogonal axes.

The local oscillator can provide (via one-by-four splitter 503 for example) a coherent local reference signal which can be propagated to 90-degree hybrids 511 and 512 and can separate the x- and y-polarized components from PBS 502 and the LO. In some examples, hybrid 511 can obtain x-related components and hybrid 512 can obtain y-related components.

PDs, TIAs, or PD/TIAs can be made from any combination of photodetectors and transimpedance amplifiers. A photodetector can be a semiconductor device that converts light into an electrical current. The photodetector can generate a current which is proportional to the number of photons hitting the surface. As electricity is generated when photons are absorbed in the photodetector, the photodetector can act as a sensor for light. The photodetector can be any device which is capable of sensing intensities and/or wavelengths of light. A photodetector can be a photodiode or a photosensor. In some examples, a photodetector can be chosen to be more sensitive to specific wavelengths of light. In some examples, a photodetector can be chosen or configured to be more sensitive or only sensitive to green light, while another photodetector can be configured to be more sensitive or only sensitive to red light. A photodetector can also be made of an array of photodetectors. A transimpedance amplifier (TIA) can be a current-to-voltage converter device which can be used to amplify the current output of a photodetector or other photon or light-detection device. PD/TIAs can thus be used to detect light in both the X-polarization and the Y-polarization and output a signal for each. As shown in FIG. 6, PD/TIAs can be configured to receive signals from 90-degree hybrids 511 and 512. The output of the PD/TIA can be a digital or analog signal.

A signal output from PD/TIAs can be converted by ADCs. An ADC converts an analog signal into a digital signal.

Digital signal processor 520 can receive the digital outputs from ADCs 618-624. Digital signal processor 520 can thus be used to extract information encoded in light in a digital format.

Figure 7:
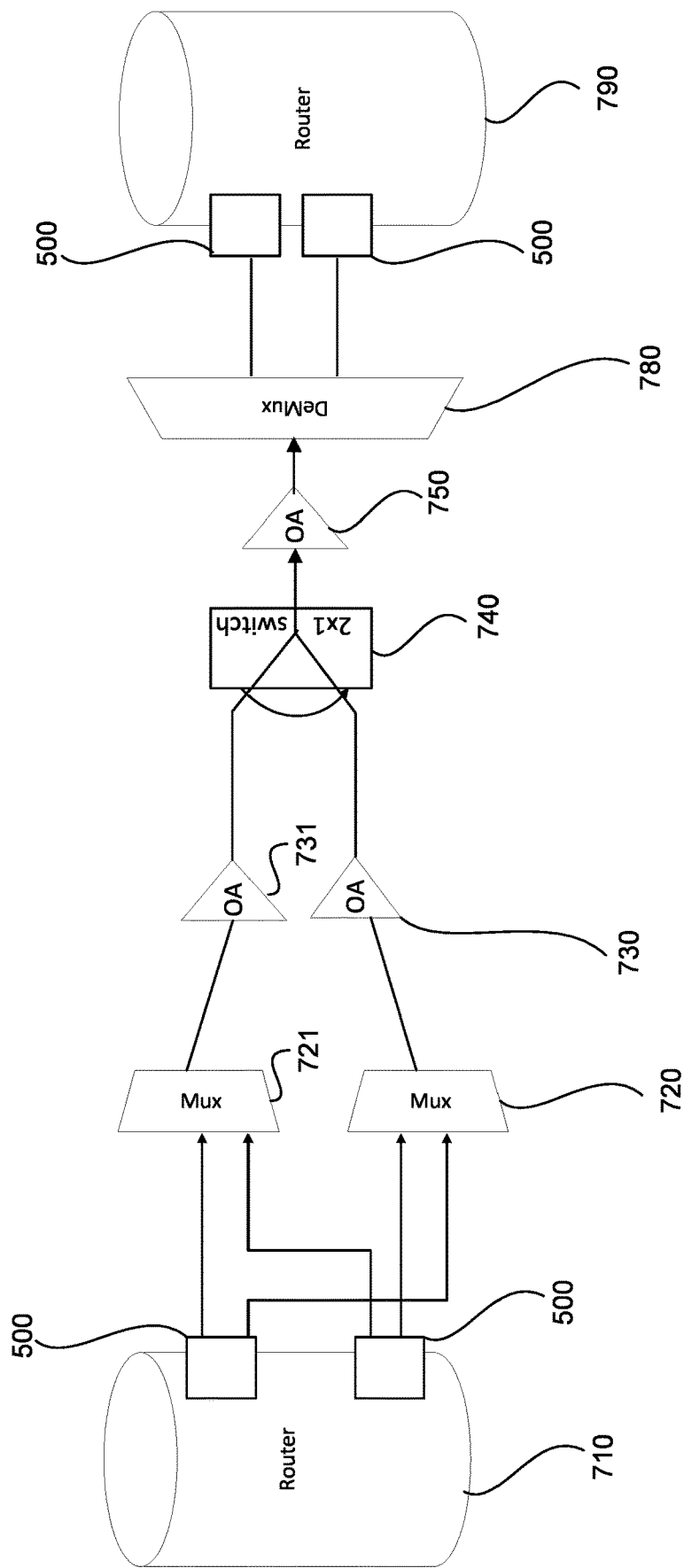
FIG. 7 illustrates example aspects of performance of aspects of the disclosure.

FIG. 7 is a schematic illustration of an example 1+1 protected transport system using the proposed dual-output and single-input coherent optical technology (only one direction is shown).

Illustrated in FIG. 7 is system 700 which can comprise routers 710 and 790, which can be similar to routers 110 and 195. Each router can contain a dual-output and single-input coherent optical module, such as module 500 of FIG. 5. System 700 can contain multiplexers (Muxs) 720 and 721, which can receive multiple input signals and synthesize a single output signal in a recoverable manner for each input signal. For example, as illustrated in FIG. 7, each optical module can provide one signal to each Mux 720 and 721. Mux 720 and 721 can output to optical amplifiers 730 and 731, which can be provided to a two-by-one switch 740. Although a two-by-one switch is described, other optical switches can be used. An optical amplifier 750 can be present between switch 740 and DeMux 780. The switch can provide a signal to DeMux 780, which can be similar to DeMux 190, which can demultiplex the signals it receives into two signals and provide them to router 790 through module 500.

The dual-output single-input coherent optical transceiver technology described herein and illustrated in FIGS. 5 and 7 may be used to compensate for launch OSNR degradation in a 1+1 protected transport system, such as is shown in FIG. 1, for example. As shown, the redundant output signal is not generated by splitting the signal. Rather, it is generated by processing the signal so that the inphase components are used to boost the signal output from the optical module. As each coherent optical module has two outputs carrying essentially the same signal, the 3 dB coupler shown in FIG. 1 is no longer required to split the original signal for 1+1 protection. The launch OSNR of FIG. 7 can be improved by at least 3 dB as compared to the system described with respect to FIG. 1.

Figure 8:
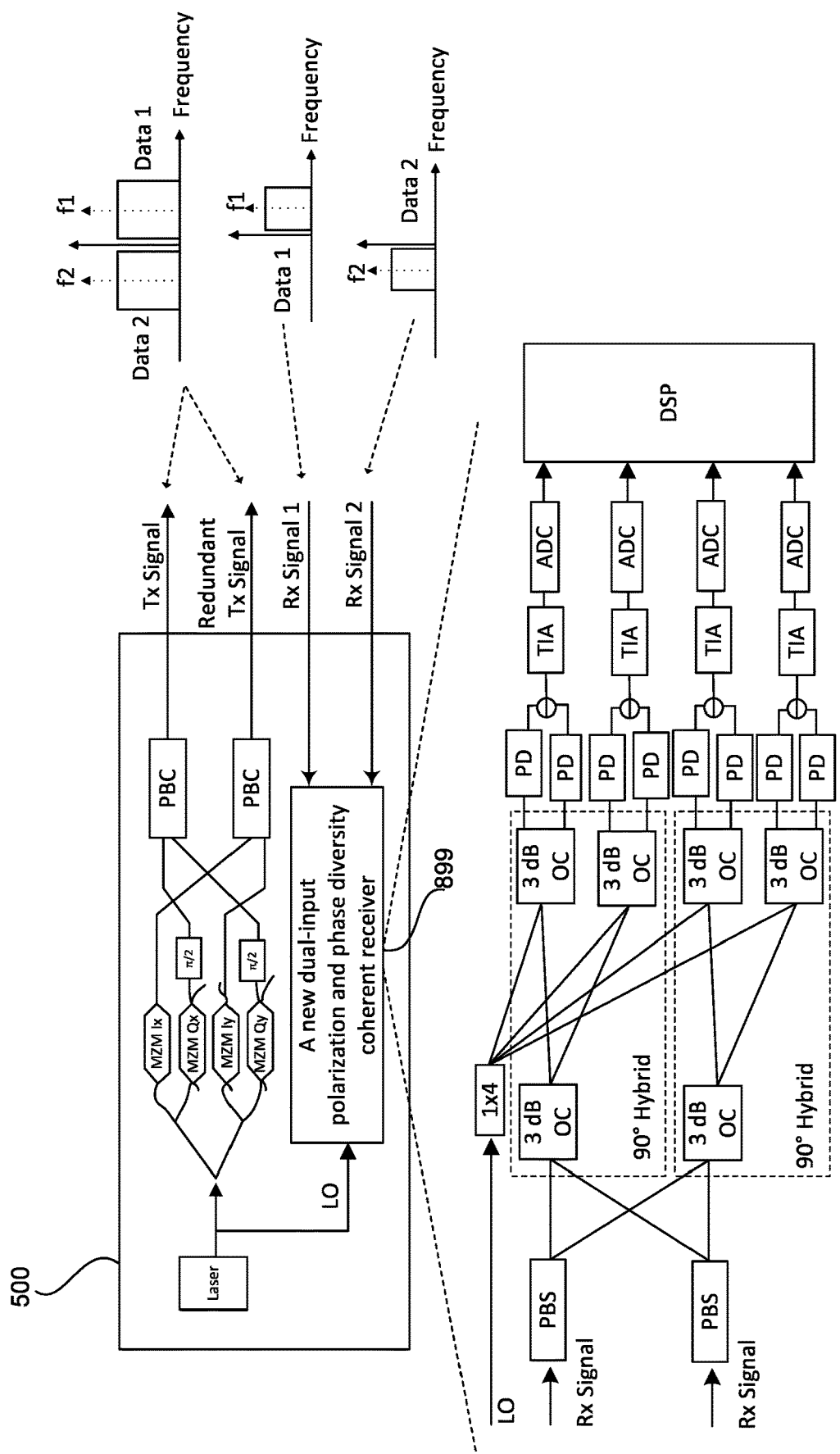
FIG. 8 illustrates dual-output, dual-input coherent optical transceiver technology according to aspects of the disclosed technology.

FIG. 8 illustrates a system 800, a dual-output, dual-input coherent optical transceiver technology which can be used for breakout applications. For clarity, not every component is labeled with respect to FIG. 8 and its components, such as the laser, MZM, PBC, OC, PD, TIA, ADC, PBS, and DSP, which have been described above, such as with respect to FIG. 6.

FIG. 8, similar to FIGS. 5 and 6, illustrates a laser which is connected to a dual-input polarization and phase diversity coherent receiver 899 through a local oscillator and a plurality of MZMs which are biased in Ix, Iy, Qx, or Qy, a number of which are connected to polarization beam combiners via rotators to produce a transmitted signal as well as a redundant transmitted signal. Receiver 899 can contain two PBS, which can split two received signals, and be optically connected to 90-degree hybrids.

The dual-output, dual-input coherent optical transceiver described with respect to FIG. 8, in combination with, for example, a digital subcarrier-based coherent optical modulation technique, can enable, for example, four 400 Gb/s or eight 400 Gb/s breakout applications while using only half of the optical components as compared to the coherent technique shown in FIG. 2. The proposed new technique can improve the link budget by more than 6 dB, with similar transceiver implementation complexity, as compared to the subcarrier-based design method shown in FIG. 3.

As illustrated in FIG. 8, not only does the transmitter allow for dual outputs without the need of an additional 3 dB coupler to split the original signal, but the receiver also allows the reception of two independent signals with different center frequencies without the need of an additional 3 dB optical coupler to combine the two received signals. As is shown in FIG. 8, the proposed new transmitter relies on an additional PBC to combine the two, otherwise unused, complementary signals of the two I/Q modulators for the second output. The proposed receiver takes advantage of the two complementary inputs of the two 90-degree hybrids plus an additional PBS to receive the two independent signals. An example implementation of this technology as a 1.6 Tb/s coherent DR4 optical module design using the proposed dual-output and dual-input coherent optical technology is shown in FIG. 9.

Figure 9:
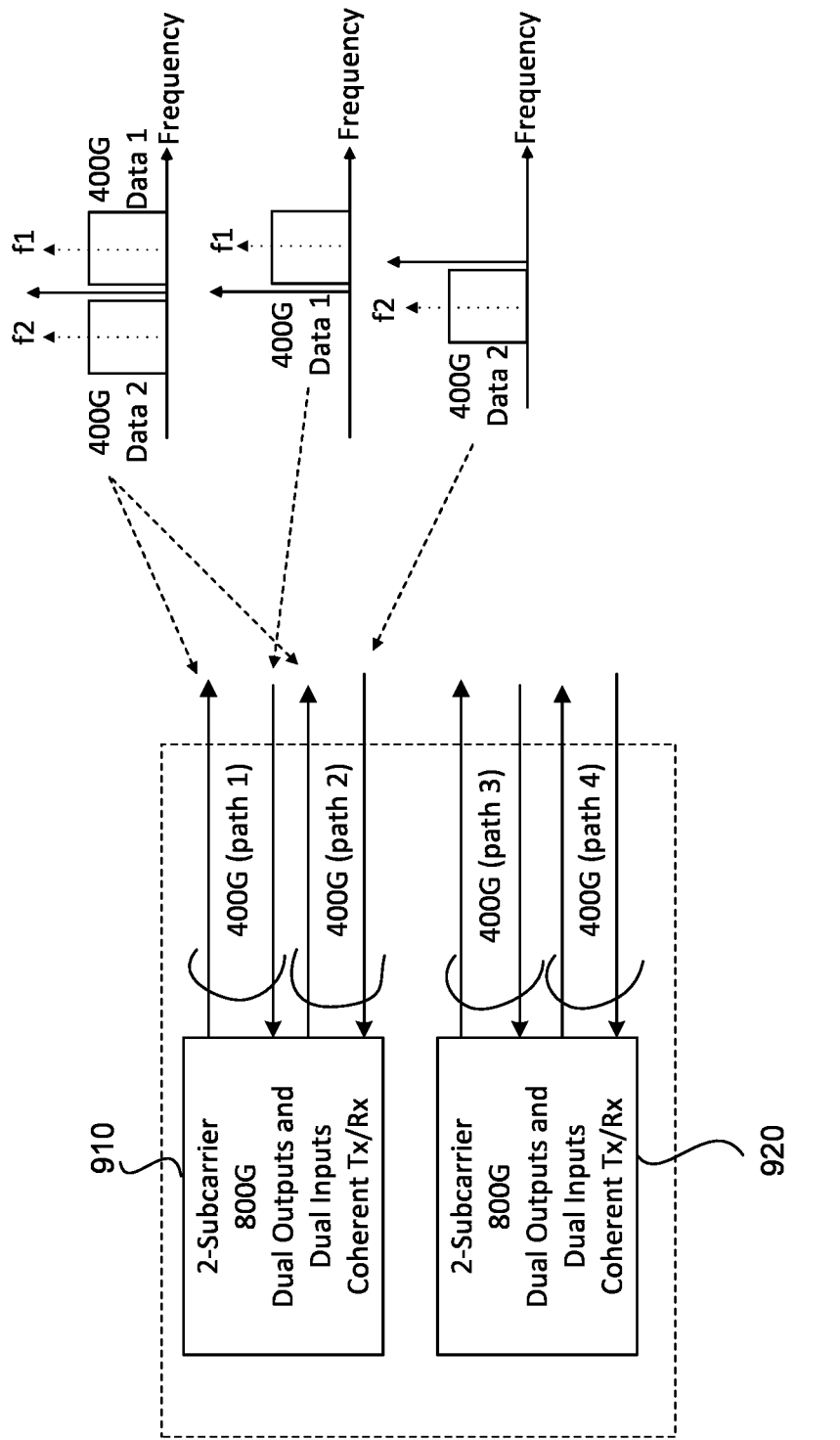
FIG. 9 is a schematic illustration of an example 1.6 Tb/s coherent DR4 optical module design using a dual-output, dual-input coherent optical technology according to aspects of the disclosed technology.

FIG. 9 is a schematic illustration of an example 1.6 Tb/s coherent DR4 optical module design using a dual-output and dual-input coherent optical technology, system 900. System 900 can contain dual-output and dual-input coherent transceivers 910 and 920, which can be similar to the transceiver described with respect to FIG. 8. As illustrated in FIG. 9, there are four data transmission paths which each operate at 400 Gb/s. As compared to FIG. 3, which illustrates a system with the same overall bandwidth, it will be appreciated by a person of skill in the art that a 3 dB coupler is not required in the transmission for the same bandwidth, increasing the optical signal to noise ratio of signals propagated in the system.

Figure 10:
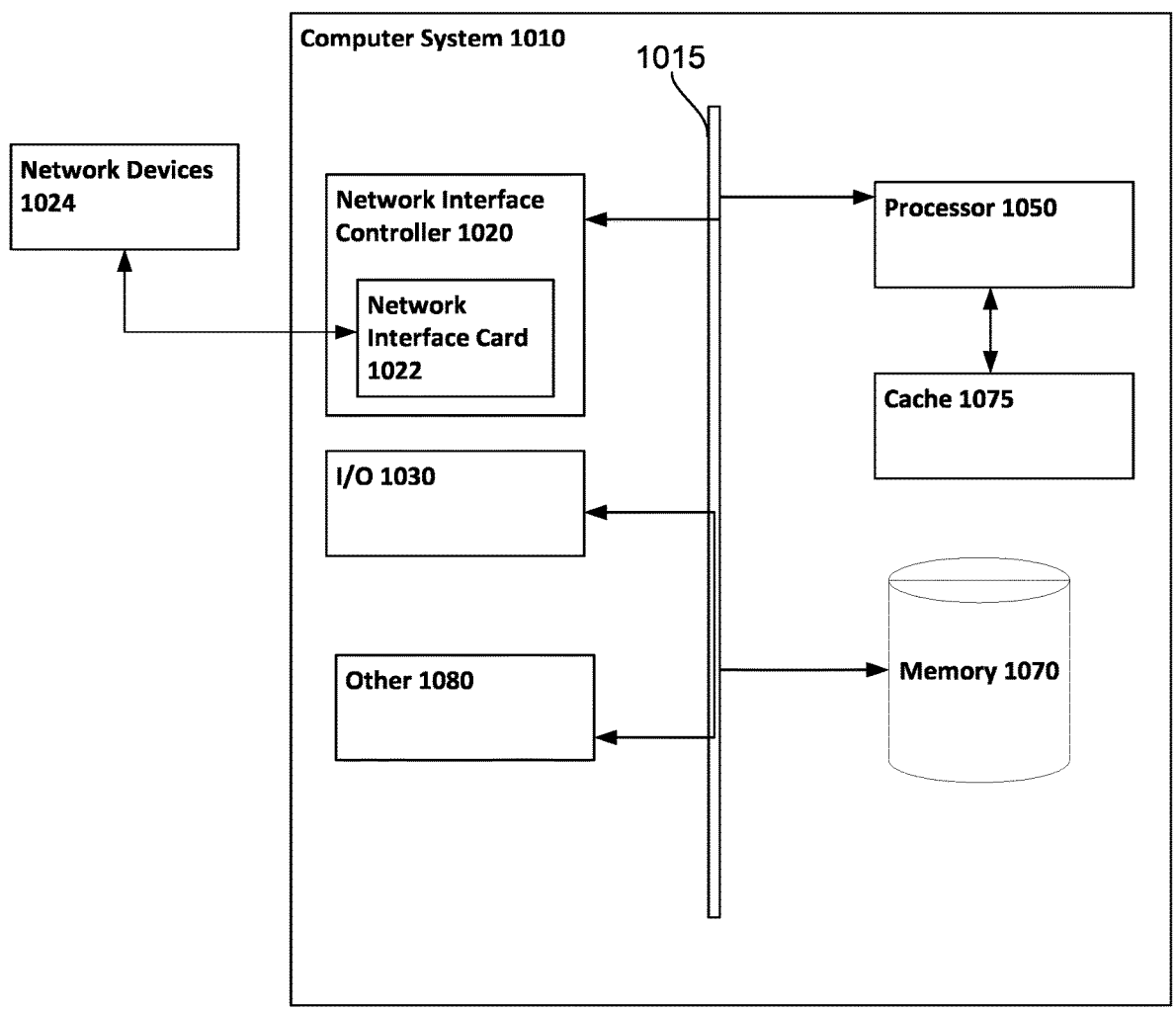
FIG. 10 illustrates an example computing system according to aspects of the disclosed technology.

FIG. 10 is a block diagram 1000 illustrating an example computer system 1010 with which aspects of this disclosure, including the techniques described herein, and any components thereof, can be implemented. In certain aspects, the example computer system 1010 may be implemented using hardware or a combination of software and hardware, either in a dedicated server, or integrated into another entity, or distributed across multiple entities. In some examples, example computer system 1010 can take the form of a digital signal processor, such as the DSPs previously discussed. In other examples, the example computing system may comprise a user computing system or device that interacts with the previously described DSPs.

In broad overview, the computer system 1010 includes at least one processor 1050 for performing actions in accordance with instructions and one or more memory devices 1070 or caches 1075 for storing instructions and data. The illustrated example computer system 1010 includes one or more processors 1050 in communication, via a bus 1015, with at least one network interface driver controller 1020 with one or more network interface cards 1022 connecting to one or more network devices 1024, memory devices 1070, and any other devices 1080, e.g., an I/O interface. The network interface card 1022 may have one or more network interface driver ports to communicate with the connected devices or components. Generally, a processor 1050 executes instructions received from memory. The processor 1050 illustrated incorporates, or is directly connected to, cache memory 1075.

In more detail, the processor 1050 may be any logic circuitry that processes instructions, e.g., instructions fetched from the memory device 1070 or cache 1075. In many embodiments, the processor 1050 is a microprocessor unit or special purpose processor. The computer system 1010 may be based on any processor, or set of processors, capable of operating as described herein. The processor 1050 may be a single-core or multi-core processor. The processor 1050 may be multiple processors. In some implementations, the processor 1050 can be configured to run multi-threaded operations. In some implementations, the processor 1050 may host one or more virtual machines or containers, along with a hypervisor or container manager for managing the operation of the virtual machines or containers. In such implementations, the methods shown and described above or the electronics described above can be implemented within the virtualized or containerized environments provided on the processor 1050 or otherwise operate in conjunction with processor 1050.

The memory device 1070 may be any device suitable for storing computer-readable data. The memory device 1070 may be a device with fixed storage or a device for reading removable storage media. Examples include all forms of non-volatile memory, media, and memory devices; semiconductor memory devices, such as EPROM, EEPROM, SDRAM, and flash memory devices; and magnetic disks, magneto-optical disks, and optical discs, such as CD-ROM, DVD-ROM, and Blu-ray® discs. A computer system 1010 may have any number of memory devices 1070. In some implementations, the memory device 1070 supports virtualized or containerized memory accessible by virtual machine or container execution environments provided by the computer system 1010.

The cache memory 1075 is generally a form of computer memory placed in close proximity to the processor 1050 for fast read times. In some implementations, the cache memory 1075 is part of, or on the same chip as, the processor 1050. In some implementations, there are multiple levels of cache 1075, e.g., L2 and L3 cache layers.

The network interface driver controller 1020 manages data exchanges via the network interface card 1022 (also referred to as network interface driver ports). The network interface driver controller 1020 handles the physical and data link layers of the OSI model for network communication. In some implementations, some of the network interface driver controller's tasks are handled by the processor 1050. In some implementations, the network interface driver controller 1020 is part of the processor 1050. In some implementations, a computer system 1010 has multiple network interface driver controllers 1020. The network interface driver ports configured in the network interface card 1022 are connection points for physical network links. In some implementations, the network interface driver controller 1020 supports wireless network connections and an interface port associated with the network interface card 1022 is a wireless receiver/transmitter. Generally, a computer system 1010 exchanges data with other network devices 1024 via physical or wireless links that interface with network interface driver ports configured in the network interface card 1022. In some implementations, the network interface driver controller 1020 implements a network protocol, such as Ethernet.

The other network devices 1024 are connected to the computer system 1010 via a network interface driver port included in the network interface card 1022. The other network devices 1024 may be peer computing devices, network devices, or any other computing device with network functionality. For example, a first network device 1024 may be a network device such as a hub, a bridge, a switch, or a router, connecting the computer system 1010 to a data network, such as the Internet.

The other devices 1080 may include an I/O interface, external serial device ports, and any additional co-processors. For example, a computer system 1010 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computer system 1010 includes an additional device 1080 such as a co-processor, e.g., a math co-processor can assist the processor 1050 with high precision or complex calculations.

Instructions on computer system 1010 may control various components and functions of computer system 1010. For example, the instructions may be executed to perform any of the methods indicated in this disclosure. In some examples, algorithms can be included as a subset of or otherwise as part of instructions included on computer system 1010. Instructions can include algorithms to execute any of the methods or a subset of the methods described within this disclosure.

User interfaces on the computer system 1010 may include, for example, an input which allows a user to interact with computer system 1010, such as a touch screen or buttons. A display can also be included such as an LCD, LED, mobile phone display, electronic ink, or other display to display information about computer system 1010. The user interface can allow for both input from a user and output to a user. A communication interface(s) can include hardware and software to enable communication of data over standards such as Wi-Fi, Bluetooth, infrared, radio-wave, and/or other analog and digital communication standards. Communication interface(s) allow for computer system 1010 to be updated and information generated by computer system 1010 to be shared to other devices. In some examples, communication interface(s) can send information stored in memory to another user device for display, storage, or further analysis.

Aspects of the disclosed technology may include, for example, a dual-input polarization and phase diversity receiver. The receiver can comprise a first polarization beam splitter configured to receive a first signal; a second polarization beam splitter configured to receive a second signal, wherein the second signal is a redundant copy of the first signal; the first polarization beam splitter configured to split the first signal into two components, and provide the first component of the first signal to a first optical coupler of a first 90-degree hybrid and the second component of the first signal to a second optical coupler of a second 90-degree hybrid; the second polarization beam splitter configured to split the second signal into two components, and provide the first component of the second signal to the first optical coupler of the first 90-degree hybrid and the second component of the second signal to the second optical coupler of the second 90-degree hybrid and wherein the first and second optical couplers of the first and second 90-degree hybrids are coupled to a local oscillator, such that the first and second 90-degree hybrids output phase or polarization information associated with the first signal. Aspects of the disclosed technology can include an optical transmission system comprising the dual-output transmitter, wherein the system does not use an optical coupler optically downstream from a demultiplexer to produce a redundant copy of a signal configured for transmission. The demultiplexer can be a wavelength division multiplexing demultiplexer. The optical transmission system can further comprise a common polarization and phase diversity receiver. In some examples, the optical transmission system can further comprise a one-by-four splitter. The optical transmission system can further comprise a polarization beam splitter. In some examples, the polarization beam splitter splits a received signal to a first 90-degree hybrid and a second 90-degree hybrid. Both polarization beam splitters each contain an optical coupler configured to receive a signal from the polarization beam splitter.

Aspects of the disclosed technology may include, for example, a dual-output transmitter, the transmitter comprising a laser; a plurality of Mach-Zehnder modulators (MZMs) coupled to the laser, a first optical rotator coupled to a first MZM of the plurality of MZMs, the first optical rotator configured to receive a first portion of a signal and rotate the first portion of the signal by 90-degrees; a second optical rotator coupled to a second MZM of the plurality of MZMs, the second optical rotator configured to receive a second portion of the signal and to rotate the second portion of the signal by 90-degrees; a first polarization beam combiner configured to receive first and second quadrature components of the rotated first and second portions of the signal, the first polarization beam combiner configured to output a first transmitted signal, and a second polarization beam combiner configured to receive first and second inphase components of the signal generated from a third MZM and a fourth MZM of the plurality of MZMs, the second polarization beam combiner configured to output a second transmitted signal; wherein the first transmitted signal and the second transmitted signal contain equivalent information. The optical transmission system can further be configured such that the system does not use an optical coupler optically downstream from a demultiplexer to produce a redundant copy of a signal configured for transmission. The optical transmission system can contain a demultiplexer which can be a wavelength division multiplexing demultiplexer. The optical transmission system may further comprise a common polarization and phase diversity receiver. The optical transmission system can further comprise a one-by-four splitter. The optical transmission system further comprises a polarization beam splitter. The optical transmission can contain a polarization beam splitter which can split a received signal to a first 90-degree hybrid and a second 90-degree hybrid.

Aspects of the disclosed technology may include, as an example, an optical transceiver for use in an optical transmission system, wherein the optical transceiver is capable of dual-output and dual-input. The optical transceiver can comprise a dual-output transmitter and a dual-input polarization and phase diversity receiver. The dual-output transmitter can comprise a laser; a plurality of Mach-Zehnder modulators (MZMs) optically downstream from the laser, each MZM configured to modulate the receive light in one of inphase-x, inphase-y, quadrature-x, and quadrature-y and output the modulated light; at least one optical rotator optically downstream from the plurality of MZMs, the at least one optical rotator configured to receive a signal from only one MZM, and configured to rotate the received signal by 90-degrees; a first polarization beam combiner configured to receive an inphase x and quadrature x generated from at least two of the plurality of MZMs, and output a first transmitted signal; a second polarization beam combiner configured to receive an inphase x and quadrature x generated from at least two of the plurality of MZMs, and configured to output a second transmitted signal; and wherein the first transmitted signal and the second transmitted signal are informationally equivalent copies of one another. The dual-input polarization and phase diversity receiver and the receiver can comprise a first polarization beam splitter configured to receive a first received signal; a second polarization beam splitter configured to receive a second received signal, wherein the second received signal is a redundant copy of the first received signal; the first polarization beam splitter configured to split the first received signal into two components, and provide the first component of the first received signal to an optical coupler of a first 90-degree hybrid and the second component of the first received signal to an optical coupler of a second 90-degree hybrid; the second polarization beam splitter configured to split the second received signal into two components, and provide the first component of the second received signal to the optical coupler of the first 90-degree hybrid and the second component of the second received signal to the optical coupler of the second 90-degree hybrid; and the receiver can be configured to be coupled to the laser via a local oscillator to recover phase or polarization information via a one-by-four module. The optical transmission system need not use an optical system to create a redundant copy of an optical signal intended to be transmitted. The first polarization beam combiner can be configured to receive an inphase x and quadrature y. The second polarization beam combiner is configured to receive an inphase x and quadrature y. The system can be configured such that the second polarization beam combiner is configured to receive an inphase x and quadrature y component. The dual-output transmitter can be configured such that the transmitter is configured to modulate via the MZMs an inphase x, inphase y, quadrature x, and quadrature y component, which can be combined in any combination to produce the first transmitted signal and the second transmitted signal.

Although examples are provided herein with respect to certain speeds, bandwidths, and combinations of components, a person of skill in the art will appreciate that the methods, techniques, and systems described herein can be generalized or scaled across a range of speeds and bandwidths.

Although the above examples are given with respect to particular methods of encoding signals and are examples, a person of skill in the art will appreciate and understand that additional variations and configurations of such methods are possible. In addition, the methods and technology disclosed herein can be combined in various permutations.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as a requirement that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A dual-input receiver, comprising:
   a first polarization beam splitter configured to receive a first signal; and
   a second polarization beam splitter configured to receive a second signal, wherein the second signal is a copy of the first signal,
   the first polarization beam splitter configured to split the first signal into a first component and a second component, and to provide the first component of the first signal to a first optical coupler of a first 90-degree hybrid and the second component of the first signal to a second optical coupler of a second 90-degree hybrid,
   the second polarization beam splitter configured to split the second signal into two components, and provide a first component of the second signal to the first optical coupler of the first 90-degree hybrid and a second component of the second signal to the second optical coupler of the second 90-degree hybrid, and
   wherein signals output by the first and second optical couplers of the first 90-degree hybrid and the second 90-degree hybrid are coupled to one or more local oscillator signals such that the first and second 90-degree hybrids output phase or polarization information associated with the first signal.

2. The dual-input receiver of claim 1, wherein the first optical coupler of the first 90-degree hybrid outputs a first coupling signal to a third optical coupler and the third optical coupler outputs a first set of output signals comprising at least a portion of output phase or polarization information.

3. The dual-input receiver of claim 2, wherein the first optical coupler of the first 90-degree hybrid outputs a second coupling signal to a fourth optical coupler and the fourth optical coupler outputs a second set of output signals comprising at least a portion of the output phase or polarization information.

4. The dual-input receiver of claim 3, wherein the local oscillator outputs the one or more local oscillation signals to the third optical coupler and to the fourth optical coupler.

5. The dual-input receiver of claim 4, further comprising a one-by-four splitter coupled to the local oscillator.

6. The dual-input receiver of claim 5, wherein the second optical coupler of the second 90-degree hybrid outputs a third coupling signal to a fifth optical coupler and the fifth optical coupler outputs a third set of output signals comprising at least a portion of the output phase or polarization information.

7. The dual-input receiver of claim 6, wherein the second optical coupler of the second 90-degree hybrid outputs a fourth coupling signal to a sixth optical coupler and the sixth optical coupler outputs a fourth set of output signals comprising at least a portion of the output phase or polarization information.

8. The dual-input receiver of claim 7, wherein the local oscillator outputs the one or more local oscillation signals to the fifth optical coupler and to the sixth optical coupler.

* * * * *